US008364634B2

(12) United States Patent
Horii

(10) Patent No.: US 8,364,634 B2
(45) Date of Patent: Jan. 29, 2013

(54) SYSTEM AND METHOD FOR PROCESSING FAULT TOLERANT TRANSACTION

(75) Inventor: Hiroshi Horii, Yamato (JP)

(73) Assignee: International Business Machines Corporation, Armonk, NY (US)

(*) Notice: Subject to any disclaimer, the term of this patent is extended or adjusted under 35 U.S.C. 154(b) by 426 days.

(21) Appl. No.: 12/234,811

(22) Filed: Sep. 22, 2008

(65) Prior Publication Data

US 2009/0138531 A1 May 28, 2009

(30) Foreign Application Priority Data

Nov. 22, 2007 (JP) .................... 2007-303105

(51) Int. Cl.
*G06F 7/00* (2006.01)
*G06F 17/00* (2006.01)
(52) U.S. Cl. ......... 707/610; 709/203; 709/214; 709/225
(58) Field of Classification Search .................. None
See application file for complete search history.

(56) References Cited

U.S. PATENT DOCUMENTS

| 4,644,546 | A | * | 2/1987 | Doi et al. ................. 714/800 |
| 5,434,994 | A | * | 7/1995 | Shaheen et al. ............ 709/223 |
| 5,737,601 | A | * | 4/1998 | Jain et al. ................. 707/622 |
| 5,926,816 | A |   | 7/1999 | Bauer |
| 7,103,586 | B2 | * | 9/2006 | Holenstein et al. ............ 1/1 |

FOREIGN PATENT DOCUMENTS

| JP | 8241234 | 9/1996 |
| JP | 8241235 | 9/1996 |
| WO | WO 2006118824 | 11/2006 |

OTHER PUBLICATIONS

J. Gray and A. Reuter, "Transaction, Processing: concepts and techniques" in "Data Management Systems Series", Morgan Kaufmann Publishers, Inc., U.S.A. (1993).
F. B. Schneider, "Implementing Fault-Tolerant Services Using the State Machine Approach: At tutorial", vol. 22, No. 4, ACM Computing Surveys (CSUR), U.S.A. (1990), pp. 299-319.

* cited by examiner

*Primary Examiner* — Loan T Nguyen
(74) *Attorney, Agent, or Firm* — Vazken Alexanian

(57) ABSTRACT

A replication system which improves fault tolerance with low latency. The replication system includes a plurality of database server units that behave as replicas in which each replica sends a first processing result to a client which receives the first processing result as an optimistic result after each replica receives and processes a transaction process request from the client device. At the same time, each replica requests generation of replication by other replicas, and sends a committable common transaction log as a second processing result to the client, which receives the second processing result as a pessimistic result. If a conflict in a transaction process does not occur, transaction processes based on requests from a plurality of clients are executed at low latency, thereby providing a replication system and method for improving fault tolerance without increasing the load of each server unit.

8 Claims, 12 Drawing Sheets

SYSTEM AND METHOD FOR PROCESSING FAULT TOLERANT TRANSACTION

CROSS-REFERENCE TO RELATED APPLICATIONS

This application claims priority under 35 U.S.C. §119 from Japanese Patent Application No. 2007-303105 filed Nov. 22, 2007, the entire contents of which are incorporated herein by reference.

FIELD OF THE INVENTION

The present invention relates to a transaction processing system, and, particularly, to a replication system and management method for improving fault tolerance.

BACKGROUND OF THE INVENTION

Conventionally, a backup is created in response to the occurrence of a process request to a database for the purpose of guaranteeing the fault tolerance performance of a database system. To provide a high fault tolerant service, a backup is generally provided at a sufficiently remote location to enable execution of a transaction at least one site even when a fault or the like occurs. Therefore, the backup is connected to a database device through network communication, and so-called synchronization is carried out to update the storage contents of the backup upon update of the storage contents of the database device.

In general, in a system using a backup, a server unit that generates a primary process result is called an active server, and a server unit that receives and saves data from which a replica is called a backup server. Examples of backup methods known are (A) a primary backup system and (B) an active-active method.

In the primary backup system (A), when a database server called a primary server processes and saves a transaction process request transmitted from a client, the primary server transmits the saved data to a backup server and requests replication thereof, the backup server notifies the end of replication to the primary server, and the primary server reports a processing result to the client after the notification (see Non-patent Document 1). The primary server is equivalent to the aforementioned active server, so that the system (A) may be called an active backup configuration.

FIG. 1 shows the sequential progress of processing by the primary backup system in a line chart. The line chart shows the time-variant or step-by-step progress downward. The progress of processing a transaction with individual computers of a client, a primary server (replica 1 in FIG. 1) and a backup server (replica 2 in FIG. 1) as constituting elements takes place in the following order:

(Step S21) The primary server receives a process request.

(Step S22) The primary server executes a requested process in predetermined procedures.

(Step S23) The primary server transmits the backup server a request of updating a replica after the process is completed.

(Step S24) The backup server creates a replica reflecting the update.

(Step S25) The backup server transmits the end of update of the replica.

(Step S26) The primary server stores that the backup server has updated the replica, which achieves the purpose of the backup.

(Step S27) The primary server transmits the end of processing to the client.

(Step S28) The client identifies the end of the transaction process.

In FIG. 1, a time $L_{PB}$ from the process request from the client to the reception of a processing result is called latency, and indicates a delay time from the generation of the request to the return of the result of the request; the longer the time $L_{PB}$ is, the higher the latency. The time $L_{PB}$ in the primary backup system (A) includes a time for one reciprocal communication and processing between the client and the primary server for a transaction process and a time for one reciprocal communication and processing between the primary server and the backup.

In the active-active system (B), a plurality of database servers which are replicas of one another are prepared. When a database server called a primary server processes and saves a transaction from a client, the transaction is transmitted to those database servers, and the client receives processing results reported from two of those database servers (see Non-patent Document 2). Each of the database servers in the system (B) is an active server in that the server itself saves process data.

FIG. 2 shows the sequential progress of processing by the active-active system in a line chart including two database servers, which are replicas of each other, called replica 1 and replica 2, as constituting elements. The processing of a transaction with the individual computers takes place in the following order:

(Step S31) Each replica receives a transaction process request.

(Step S32) Each replica executes a requested process in predetermined procedures. The processes of the replica 1 and the replica 2 are S32-1 and S32-2, respectively.

(Step S33) Each replica transmits a processing result to the client. The processes of the replica 1 and the replica 2 are S33-1 and S33-2, respectively.

(Step S34) The client identifies the end of the requested process upon reception of one processing result. In FIG. 2, the client receives the processing result of S33-1 and identifies the end of the process at the timing of S34.

Non-patent Document 1: J. Gray and A. Reuter, "Transaction, Processing: concepts and techniques" in "Data Management Systems Series", Morgan Kaufmann Publishers, Inc., U.S.A. (1993).

Non-patent Document 2: F. B. Schneider, "Implementing Fault-Tolerant Services Using the State Machine Approach: At tutorial", Vol. 22, No. 4, ACM Computing Surveys (CSUR), U.S.A. (1990), pp. 299-319.

SUMMARY OF THE INVENTION

It is an object of the present invention to execute transaction processes based on requests by a plurality of clients with low latency in a replication system which can guarantee the atomicity (unity) of transaction processes.

It is another object of the invention to provide a replication method and computer program product for improving the fault tolerance without increasing the loads of individual server units.

It is a further object of the invention to ensure that a transaction resumes when a fault occurs.

To overcome existing problems, the present invention has the following means:

In the replication system, each database server unit serves as a replica of others, and includes means for causing each replica to receive a same transaction process request. Each database server unit further includes means for causing each replica to execute a transaction process and storing a process end identification condition for identifying end of a transaction process, a subset of committed transactions and a processing result as a first processing result. The replica further includes means for causing each replica to determine a single committable transaction log by communicating transaction logs with other replicas after storing the first processing result. The replica includes means for causing each replica to notify completion of commitment to all other replicas after committing the determined transaction log. The replica includes means for causing each replica to store a processing result of the committed transaction as a second processing result.

The replication method and the computer program product include the steps of causing each replica to receive a same transaction process request, causing each replica to execute a transaction process and storing a process end identification condition for identifying end of a transaction process, a subset of committed transactions and a processing result as a first processing result, causing each replica to determine a single committable transaction log by communicating transaction logs with other replicas after storing the first processing result, causing each replica to notify completion of commitment to all other replicas after committing the determined transaction log and causing each replica to store a processing result of the committed transaction as a second processing result.

The replication system of the present invention has means of being capable of guaranteeing the atomicity (unity) of transaction processes by selecting either a commitment condition or a rollback condition as a process end identification condition, and storing and transmitting a first processing result to a client, thus bringing about an effect of low latency in the transaction processes. In other words, it is possible to shorten the time to identification of the end of a transaction process requested by the client.

Further, as communications between database server units for generating a second processing result are executed asynchronously, replication intervals between replicas can be increased, making it possible to provide a replication system and method for improving the fault tolerance without increasing the loads of individual server units.

DETAILED DESCRIPTION OF THE PREFERRED EMBODIMENTS

According to a first embodiment of the present invention, there is provided a replication system for replicating data by a plurality of database server units connected to one another via a computer network.

According to another embodiment of the present invention, there is provided a replication method for replicating data by a plurality of database servers connected to one another via a computer network.

In the conventional primary backup system (A), communications take place in series in two reciprocations, a client-primary reciprocation and a primary-backup reciprocation, and the client is in a standby state during the period of the two reciprocations. That is, the primary backup system has a problem of high latency until a client receives a processing result. The system also has a problem that the processing performance depends on the maximum performance of communications between replicas.

Because the conventional active-active system (B) involves one reciprocal processing path as seen from a client, it has lower latency than the system (A). However, the system (B) does not perform synchronization between a plurality of database server units or creation of replicas reflecting update. Specifically, when results depend on the sequential order of a client's request, consistency of transactions cannot be obtained. The system (B) has a problem that a process is limited to a known progression in which only one client is accepted and the sequential order of processes is fixed, i.e., to a so-called "deterministic transaction". More specifically, a problem occurs when transaction process requests from other clients occur in the same period.

Figure 1:
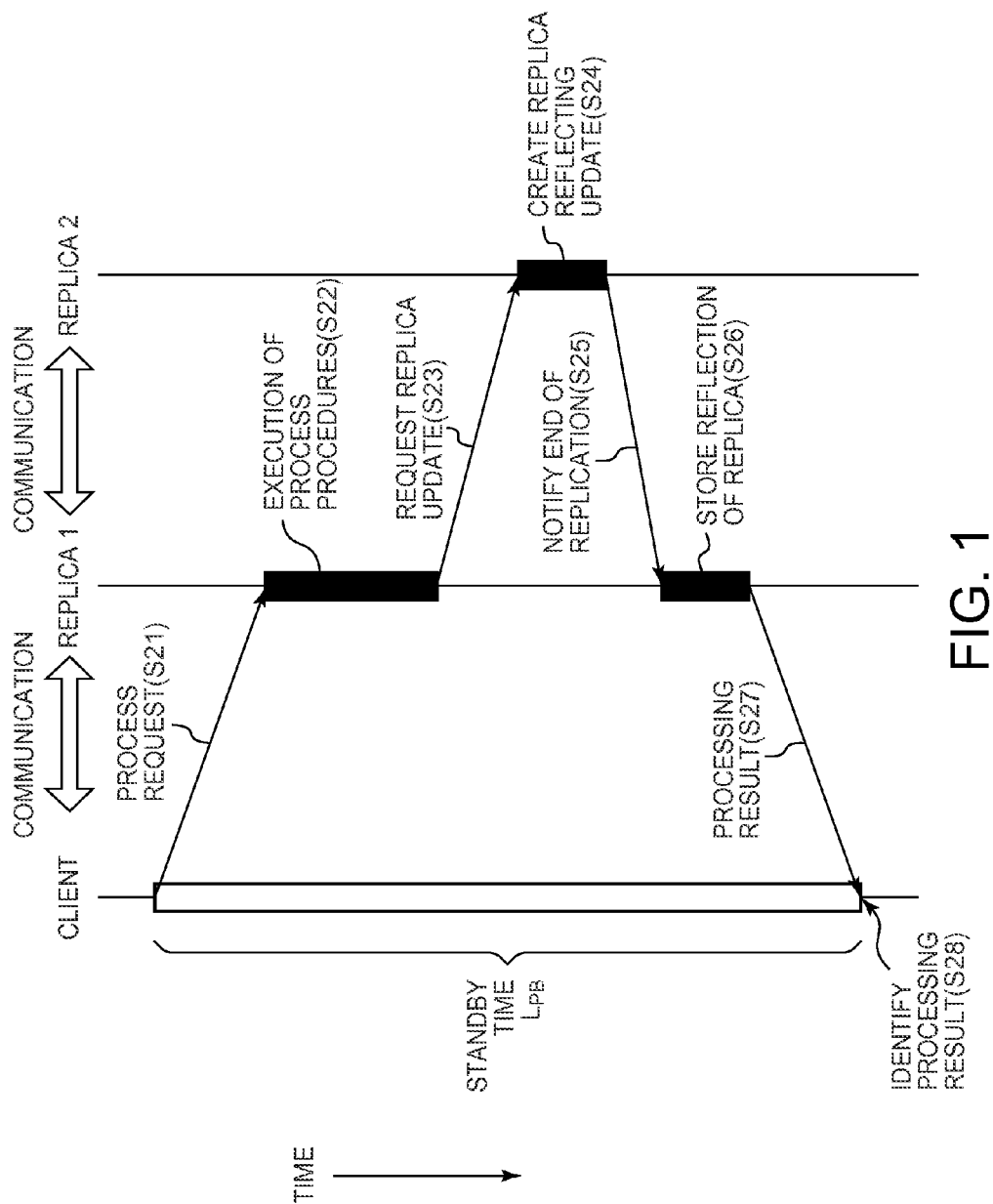
FIG. 1 is a diagram showing the sequential progress of the processing stages of the conventional primary backup system.
Figure 2:
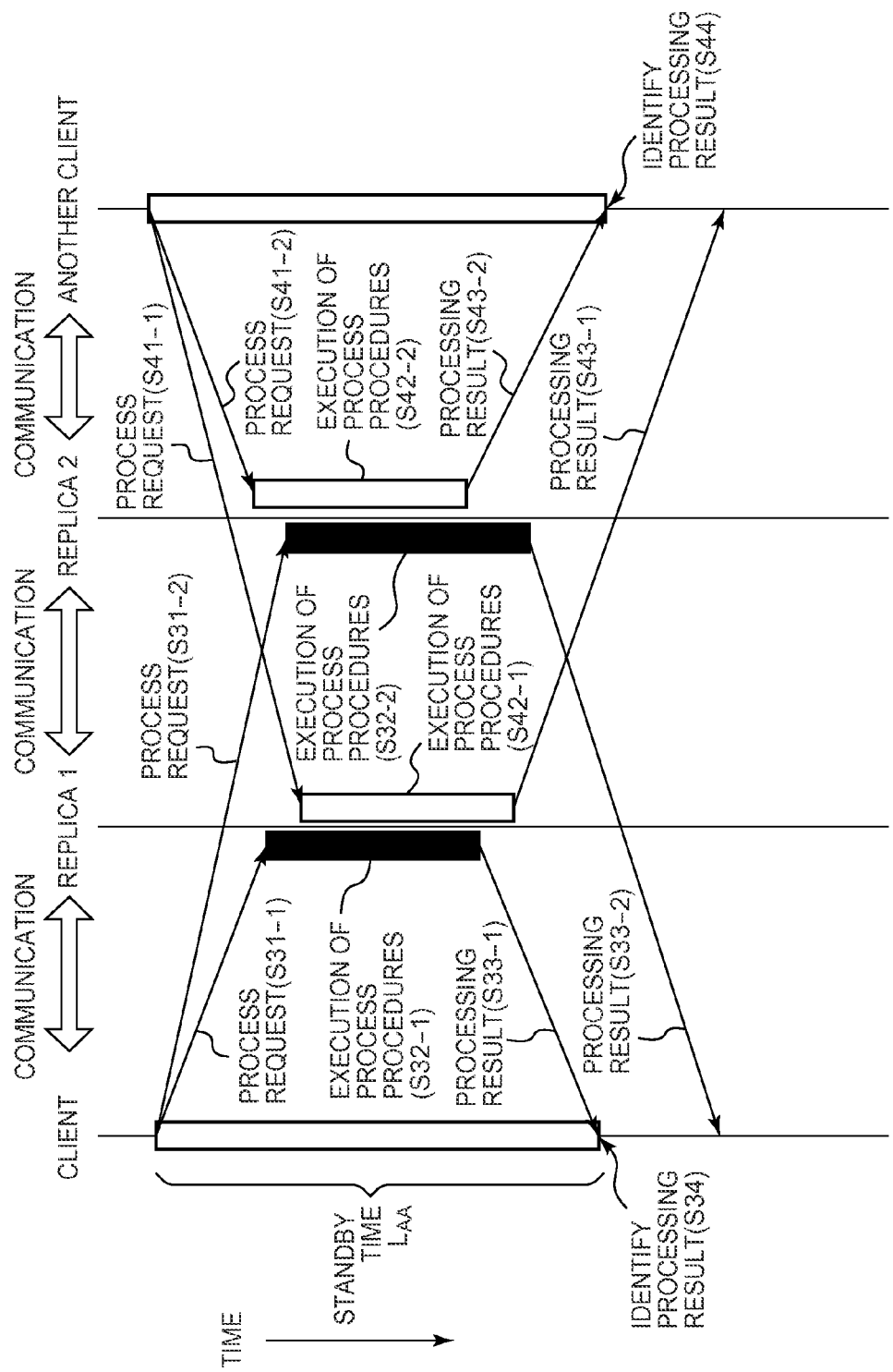
FIG. 2 is a diagram showing the sequential progress of the processing stages of the conventional active-active system.

In FIG. 2, when transaction process requests from other clients occur in addition to the transaction process request from the client, following steps are added to the process.

(Step S41) Other clients transmit transaction process requests to the individual replicas.

(Step S42) Each replica executes the requested process in predetermined procedures. The processes of the replicas are S42-1 and S42-2.

(Step S43) Each replica transmits a processing result to other clients.

(Step S44) Upon reception of a single processing result, the other clients identify the end of the requested process.

Paying attention to the process of the foregoing replica 1, after receiving the process request from the client at S31-1 and before transmitting the processing result at S33-1, the replica 1 receives process requests from the other client at S41-1, and when the update content of the process in the replica 1 depends on the execution order, the update content of the replica 1 may differ from the update content of the replica 2.

When purchase orders from a plurality of consumers are accepted for a commodity which remains only one in stock, for example, the result of updating a transaction depends on the order of requested processes or which consumer is to be accepted earlier.

That is, replicas differ from one another for a single transaction process request in the system (B). In other words, the system (B) may not be able to keep the consistency of transactions.

In the active-active system (B) in FIG. 2, a transaction process is possible if at least one replica can transmit a processing result to a client without occurrence of a fault. A time $L_{AA}$ from the process request from the client to the reception of a processing result is the shortest one of times for a plurality of single reciprocal communications and processes for a transaction process. That is, the active-active system (B) can have lower latency than the primary backup system which requires times for two reciprocal communications.

As a replication system and method according to an embodiment of the present invention, a system and method configured to have low latency while keeping the consistency of transaction processes will be described below.

A first processing result in the replication system according to the embodiment of the invention is consistent if there is no conflict of transactions originating from process requests or the like from other clients. This processing result is included in the terminology category called an "optimistic result" (or "speculative result") in the art.

A second processing result in the replication system according to the embodiment of the invention is a result after each replica saves the same processing result, and is not influenced by other transaction processes. The client's standby time for this processing result is longer than that of the optimistic result, and the processing result is included in the terminology category called a "pessimistic result" in contrast to the optimistic result in the art.

The optimistic result and pessimistic result are stored in a replica which has generated a processing result, and can be transmitted to other replicas or clients.

The process end identification condition of a transaction included in the first processing result will be illustrated. Hereinafter, a transaction which is processed with an n-th transaction process request Tn being triggered is called a transaction Tn. A transaction in an intermediate state between generation of the first processing result and determination of a single committable transaction log is called an unresolved state, a transaction in an intermediate state determination of a single committable transaction log and notification of completion of committing to each replica is called a committing state, and a state in which each replica being in a committed state is identified is called a committed state.

Set of Commitment Conditions, Set of Rollback Conditions

The process end identification condition of a transaction is comprised of a set of commitment conditions and a set of rollback conditions. Paying attention to a specific replica A, those conditions are defined as follows.

The commitment condition is that "to commit an update log of a transaction Ti generated by the replica A, the same update log as an update log of a transaction Tj generated by the replica A is committed (Ti=>Tj)". The set of commitment conditions included in the process end identification condition of the replica A is represented by $C_A$.

The rollback condition is that "to commit an update log of a transaction Ti generated by the replica A, the same update log as an update log of a transaction Tj generated by the replica A is not committed (Ti<=>Tj)". The set of rollback conditions included in the process end identifying condition of the replica A is represented by $R_A$.

Generation of Commitment Conditions by Replica A

When a transaction Ti updates data for processing and a transaction Tj refers to the data in the replica A, the replica A generates a commitment condition represented by a logical formula (Ti=>Tj). More specifically, the logical formula is a commitment condition such that "to commit an update log of the transaction Tj generated by the replica A, the same update log as an update log of a transaction Ti generated by the replica A is committed". At the time of generating the commitment condition, the transaction Ti may be any of the unresolved state, the committing state and the committed state.

Because a transaction can refer to plural pieces of data, the replica A generates a plurality of commitment conditions in a transaction process as a process end identifying condition.

Generation of Set of Rollback Conditions by Replica A

When a transaction Tk in an unresolved state updates data for processing and a transaction Ti refers to data which conflicts with the data in the replica A, the replica A generates a rollback condition represented by a logical formula (Ti<=>Tk). More specifically, the logical formula is a commitment condition such that "to commit an update log of the transaction Ti generated by the replica A, the same update log as an update log of the transaction Tk processed by the replica A is not committed".

Because a transaction can refer to plural pieces of data, the replica A generates a plurality of rollback conditions in a transaction process as a process end identifying condition.

Generation of Condition from Part of Commitment Conditions and/or Rollback Conditions With regard to "the update log of Tj generated by the replica A being committed" which constitutes a part of the commitment condition generated by the replica A (Ti=>Tj), the replica A can also generate a process end identifying condition of this part. The generated process end identifying condition is a set of commitment conditions and/or a set of rollback conditions as the process end identifying condition of Ti can respectively include $C_A$, $R_A$.

Method of Generating Subset of Committed Transactions

A subset of committed transactions with respect to a transaction T is a set of transactions in a committing state and/or committed state in transactions included in commitment conditions in the process end identifying condition. Each replica generates a subset of $S_A$ of committed transactions acquired from the product of a set of transactions included in commitment conditions in the process end identifying condition and a set of transactions in a committing state and/or committed state in the replica A.

Determination of End of Transaction Process

A client determines the end of a transaction process from the process end identifying condition of a transaction and a subset of committed transactions received from each replica.

First, a sum-set of a subset of all committed transactions committed is generated.

Next, it is determined whether Ti is included in a sum-set of committed transactions in rollback conditions in the process end identifying conditions of all the transactions (Ti<=>Tj), and if Ti is included therein, Tj is included in a set $R_A$ of rollback settled conditions. If there is (Ti<=>Tj) where any Tj is not included in $R_A$ in all rollback conditions (Ti<=>Tj), it is determined that processing of a transaction has not been completed.

Next, sets $C_A$, $C_B$ of commitment conditions of process end identifying conditions of two transactions are selected. It is assumed that the elements of the commitment conditions $C_A$ are (Ti=>Tj) and the elements of the commitment conditions $C_B$ are (Ti=>Tk).

A description will be given using $C_A$ by way of example. A set $U_A$ of commitment conditions where Ti is not included in $S_A$ in all commitment conditions (Ti=>Tj) of $C_A$ is generated.

With regard to $C_B$, a set $U_B$ is likewise generated from commitment conditions (Ti=>Tk).

Then, it is checked if every (Ti=>Tk) in $C_B$ is included in $C_A$ for every Ti in the elements (Ti=>Tj) in a differential set ($U_A$-$U_B$), and if not, it is not determined as the end of processing.

When the check is performed for every $C_A$, $C_B$ and it is not determined as "unable to determine end of processing", it is determined that processing of a transaction has been completed.

In the replication system according to the embodiment of the present invention, when a client can check the end of processing of a transaction at the stage of the first processing result, the client can check the end of processing of a transaction with latency equivalent to the latency of the active-active system (B) described above.

When a client does not check the end of processing of a transaction at the stage of the first processing result, the client checks the end of processing of a transaction at the stage of the second processing result and can check the end of processing of a transaction with latency equivalent to the latency of the primary backup system (A) described above.

If there are few conflicts among the transactions, it is possible to check the end of processing of a transaction at the stage of the first processing result. That is, the replication system of the present invention brings about an effect such that a client can check the end of processing of a transaction with low latency without inconsistency as compared with the primary backup configuration.

Figure 3:
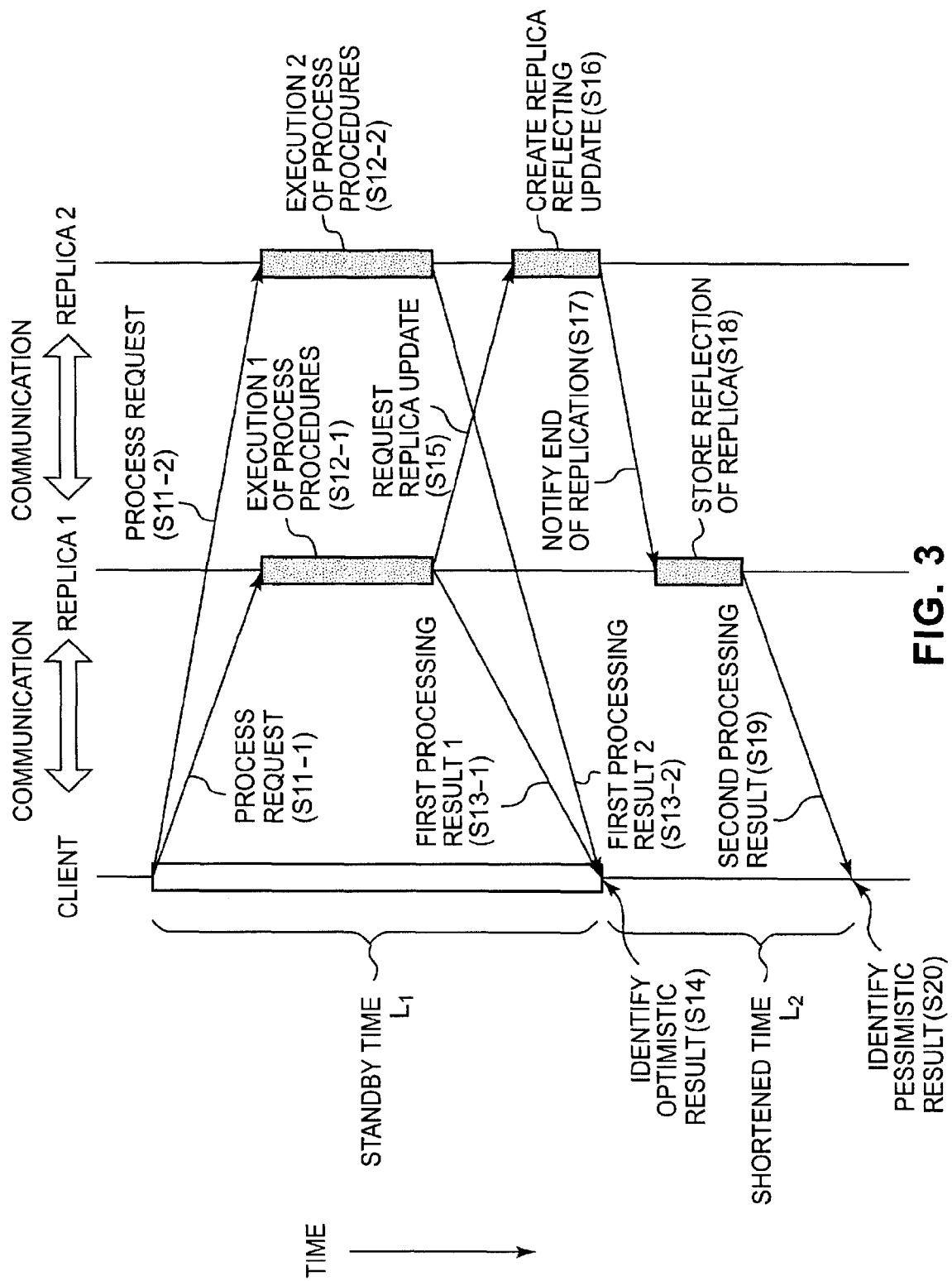
FIG. 3 is a diagram showing the sequential progress of the processing stages of a replication system according to an embodiment of the present invention.

The embodiment of the present invention will be further elaborated referring to the accompanying drawings.
Operation of Replication System FIG. 3 shows the sequential progress of processing by the replication system according to the embodiment of the present invention in a line chart. FIG. 3 exemplifies computers of a single client, a replica 1 and a replica 2 being connected to one another over a network as a minimum configuration of the invention. The progress of processing a transaction takes places in the following order:

(Step S11) A client transmits process requests to the replica 1 and the replica 2. The process request to the replica 1 is indicated by S11-1 and the process request to the replica 2 is indicated by S11-2. The process stages in the two replicas will be described below similarly:

(Step S12) Each replica executes a requested process in predetermined procedures.

(Step S13) Each replica transmits a first processing result to the client.

(Step S14) The client receives the first processing result and identifies it as an optimistic result.

(Step S15) The replica 1 transmits a replica update request to the replica 2.

(Step S16) The replica 2 creates a replica reflecting the update.

(Step S17) The replica 2 transmits the end of replica update to the replica 1.

(Step S18) The replica 1 stores the replica being updated.

(Step S19) The replica 1 transmits a second processing result to the client.

(Step S20) The client receives the second processing result and identifies it as a pessimistic result.

The first processing result is consistent if there is no conflict among the transactions originating from process requests from other clients not shown in FIG. 3. Under a condition that no conflict of transaction processes occurs, therefore, a transaction process can be terminated when the client identifies an optimistic result. The standby time of the client at this time is a standby time $L_1$ in FIG. 3.

The second processing result is a result after each replica saves the same processing result, and is not influenced by other transaction processes. The client's standby time for this processing result becomes longer than that of the optimistic result. The client's standby time is ($L_1$+$L_2$) or a standby time $L_2$ added to the standby time $L_1$ in FIG. 3.

In other words, the standby time $L_2$ is a differential standby time shortened from the client's standby time $L_{PB}$ that is needed in the primary backup system under a condition that no collision of transaction processes occurs.

Figure 4:
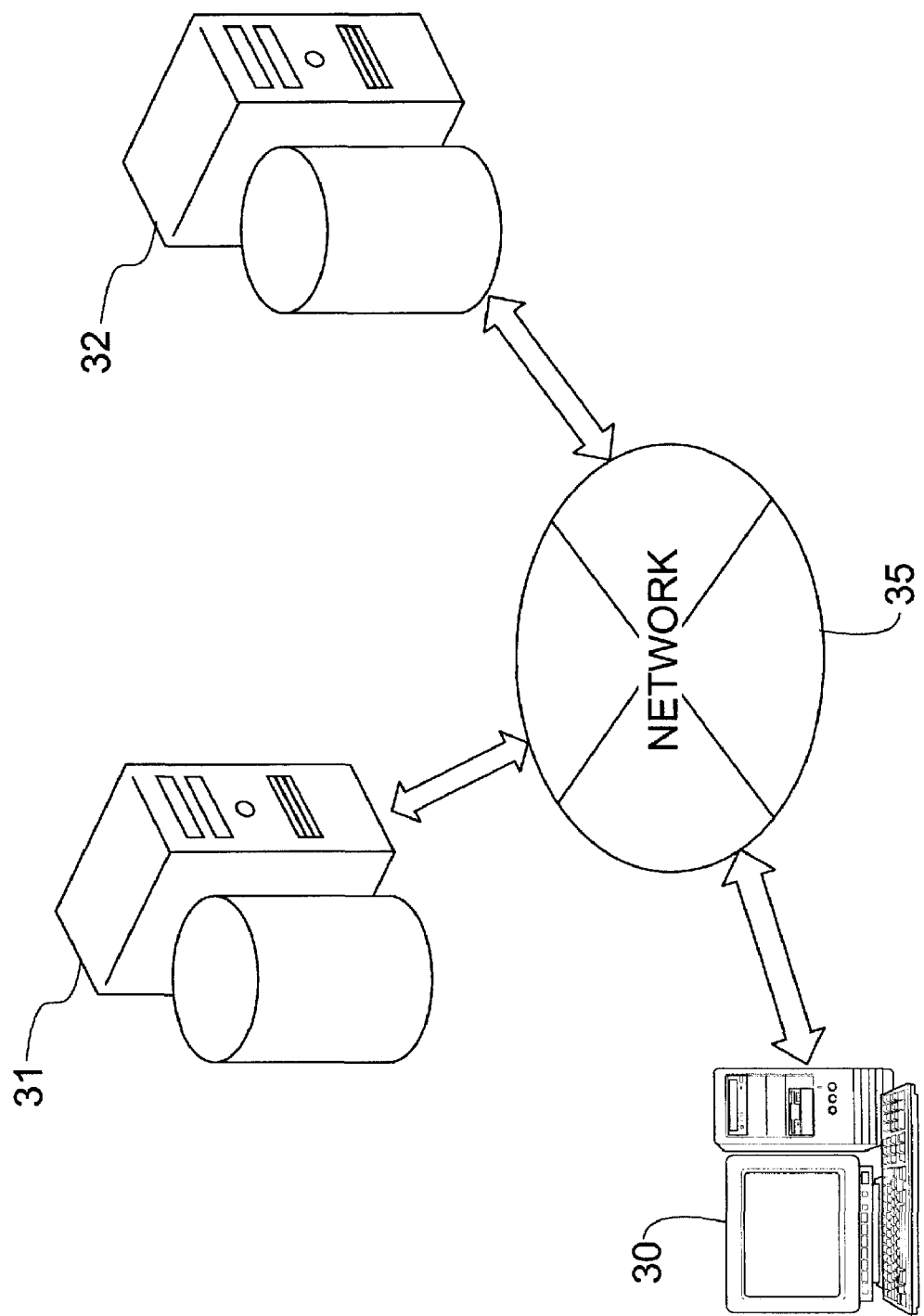
FIG. 4 is a diagram showing the connection of server units and a client device in the replication system according to the embodiment of the present invention.

The replication system of the present invention can shorten the standby time of $L_2$ under a condition that the collision does not occur.
Configuration of Replication System FIG. 4 shows systems which constitute a replication system and are connected over a computer network.

This replication system has at least one client device 30 and at least two database server units connected to a computer network 35 to enable data communications with one another. Although FIG. 4 exemplifies a database server unit-1 (31) and a database server unit-2 (32), which are not restrictive, two or more database server units can be optionally combined in the replication system. With regard to the client device, one or more client devices can be used.

Each of the client device and the database server units can be an independent computer or server unit. Particularly, database server units which are replicas of one another may be disposed at remote locations to increase fault tolerance; for example, the database server units may be set adequately so that a first database server unit is located near a large city and a second database server unit is located in a restricted area in a desert.

The computers included in the replication system have only to be able to communicate with one another over a network; all the computers may be located within the same country or some of the computers may be located in foreign countries.

Figure 5:
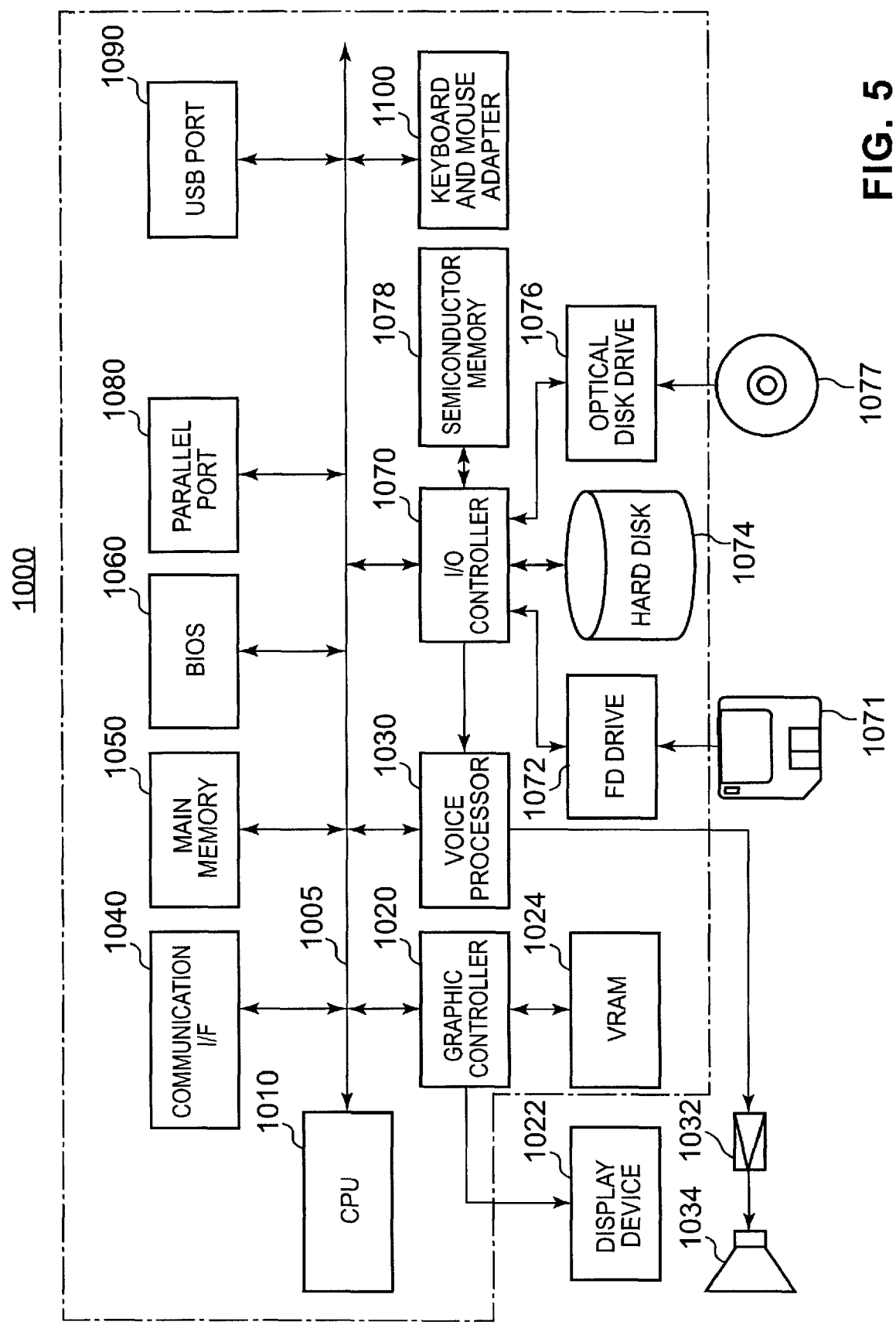
FIG. 5 is a block diagram showing the hardware resources of the server unit or client device in the replication system according to the embodiment of the present invention.

The physical means of the computer network 35 can be optionally selected for example from cable communication, wireless communication, or optical communication.
Hardware Configuration of Database Server Unit or Client Device FIG. 5 shows the hardware configuration of each database server unit or client device as an information processing apparatus 1000 included in the replication system. While the general configuration of the information processing apparatus typified by a computer will be described hereinafter, it is needless to say that the minimum configuration necessary according to the environment can be selected.

The information processing apparatus 1000 includes a CPU (Central Processing Unit) 1010, a communication I/F (interface) 1040, a main memory 1050, a BIOS (Basic Input Output System) 1060, a parallel port 1080, a USB (Universal Serial Bus) port 1090, a graphic controller 1020, a VRAM (Video RAM) 1024, a voice processor 1030, an I/O (Input/Output) controller 1070, and a keyboard and mouse adapter 1100. The I/O controller 1070 can be connected with storage means, such as a flexible disk (FD) drive 1072, a hard disk 1074, an optical disk drive 1076 and a semiconductor memory 1078.

The voice processor 1030 is connected with an amplifier circuit 1032 and a speaker 1034. The graphic controller 1020 is connected with a display device 1022.

The BIOS 1060 stores a boot program which is executed by the CPU 1010 when the information processing apparatus 1000 is activated, and programs or the like which depend on the hardware of the information processing apparatus 1000. The FD (Flexible Disk) drive 1072 reads programs or data from a flexible disk 1071, and provides the main memory 1050 or the hard disk 1074 with the programs or data via the I/O controller 1070.

While FIG. 5 shows an example where the hard disk 1074 is included in the information processing apparatus 1000, a hard disk may be connected or expanded to outside the information processing apparatus 1000 via an external-device connection interface (not shown) connected to a bus line 1005 or the I/O controller 1070.

A DVD-ROM drive, CD-ROM drive, DVD-RAM drive or CD-RAM drive, for example, can be used as the optical disk drive 1076. In this case, an optical disk 1077 which is compatible with the individual drives should be used. The optical disk drive 1076 can read programs or data from the optical disk 1077 and provide the main memory 1050 or the hard disk 1074 with the programs or data via the I/O controller 1070.

A computer program to be supplied to the information processing apparatus 1000 is stored in a recording medium, such as the flexible disk 1071, the optical disk 1077 or a memory card, and supplied to the information processing apparatus 1000 are supplied to a user in that manner. This computer program is read from the recording medium via the I/O controller 1070, or downloaded through the communication I/F 1040 to be installed into and executed by the information processing apparatus 1000. The operations that the computer program allows the information processing apparatus 1000 to execute are the same operations of the database server unit or the client device as have already been explained.

The computer program may be stored in an external storage medium. As the storage medium, a magneto-optical recording medium, such as MD, or a tape medium can be used in addition to the flexible disk 1071, the optical disk 1077 or a memory card. A storage device, such as a hard disk or an optical disk library, provided in a server system connected to a private communication circuit or the Internet may be used as a recording medium, so that a computer program is supplied via the communication circuit.

Although the foregoing description of the example has been given mainly of the information processing apparatus 1000, functions similar to those of the information processing apparatus described above can be achieved by installing a program having the functions of the information processing apparatus explained above into a computer and causing the computer to function as the information processing apparatus.

The apparatus can be realized as hardware, software or a combination of hardware and software. In an embodiment realized by the combination of hardware and software, a typical example of the embodiment is a computer system having a predetermined program. In this case, as the predetermined program is loaded into and executed by the computer system, the program causes the computer system to execute processes according to the present invention. The program is comprised of commands which can be expressed by a language, code, or notation. Such commands can allow the system to execute specific functions directly, or after execution of one of (1) transform of the commands to another language, codes or notation and (2) their copy onto another medium, or both. Of course, such a program itself as well as a program product including a medium recording the program is included in the scope of the present invention. The program for executing the functions of the present invention can be stored in a computer readable medium, such as a flexible disk, MO, CD-ROM, DVD, a hard disk drive, ROM, MRAM or RAM. Such a program can be downloaded from another computer system connected by a communication circuit, or copied from another medium to be stored in a computer readable medium. The program can be compressed or divided into a plurality of subprograms to be stored in a single recording medium or a plurality of recording media.

Connection Relation Among Clients and Databases

Figure 6:
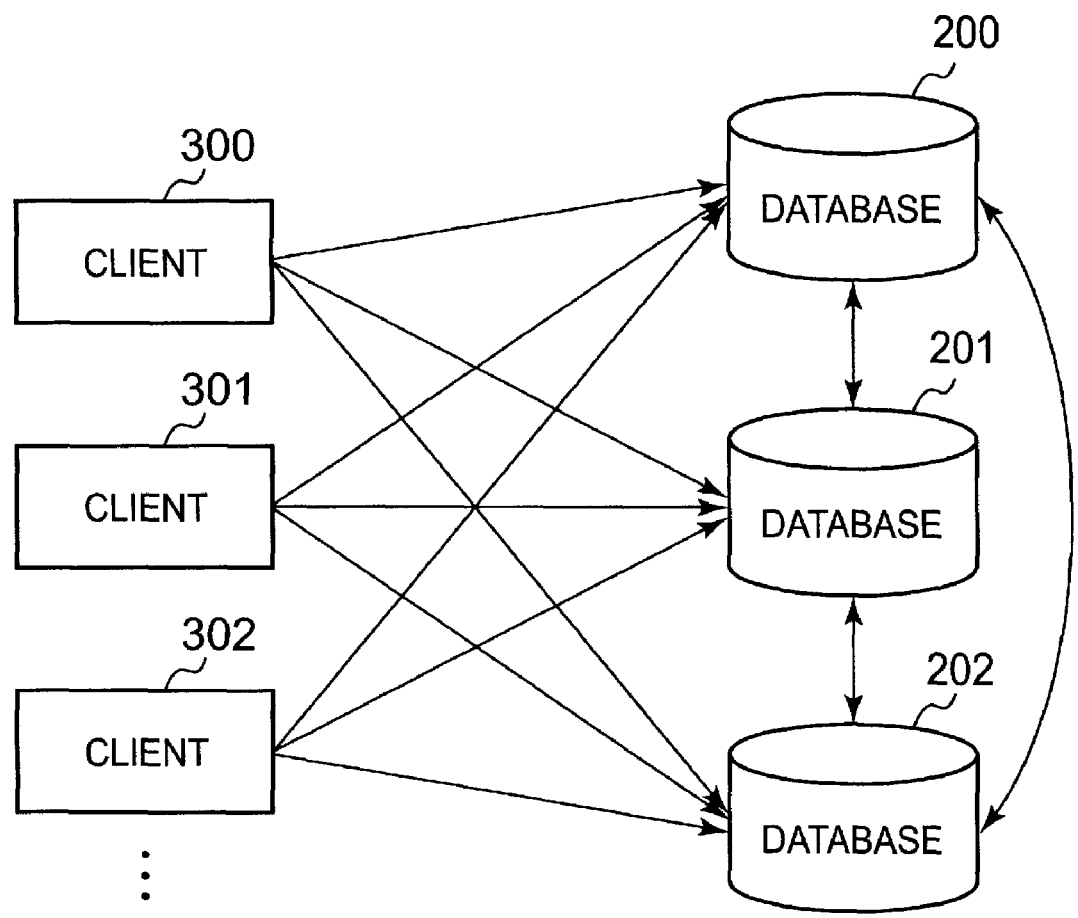
FIG. 6 is a diagram showing the connection of a plurality of clients and a plurality of databases included in the replication system according to the embodiment of the present invention.

FIG. 6 shows the connection relation among a plurality of clients and a plurality of databases according to the replication system. Although FIG. 6 shows three clients and three databases, the numbers of clients and databases to be connected are not restrictive.

Each of clients 300, 301, 302 as shown in FIG. 6 can be connected to any of databases 200, 201 and 202. Each of the databases 200, 201, 202 can be connected to another database. The databases 200, 201, 202 are replicas of one another, and may each be called a replica. Although FIG. 6 shows three clients and three databases, the numbers are not restrictive and a number of clients and a number of databases may be connected in the replication system of the present invention.

Figure 7:
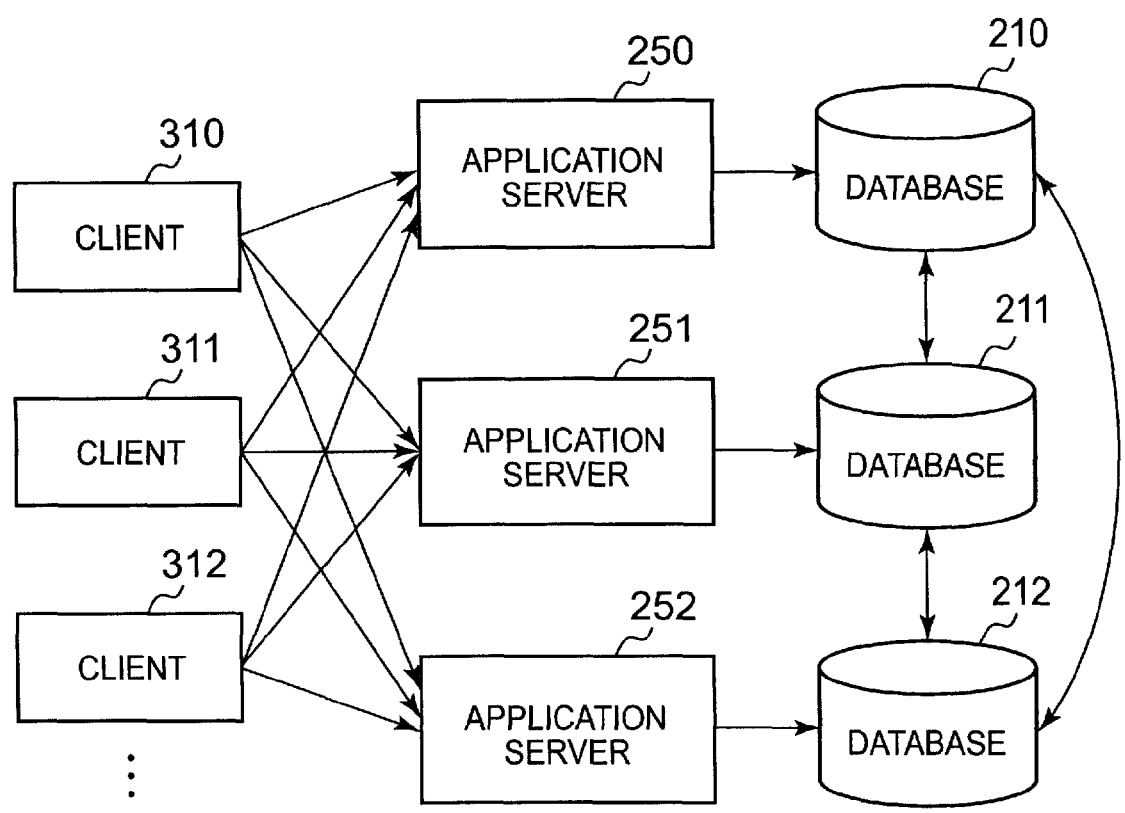
FIG. 7 is a diagram showing the connection of a plurality of clients and a plurality of databases accompanied with application servers included in the replication system according to the embodiment of the present invention.

FIG. 7 shows another example of the configuration of the replication system. FIG. 7 shows application servers respectively connected to the databases shown in FIG. 6. More specifically, application servers 250, 251, 252 in FIG. 7 are connected to the databases 200, 201, 202 respectively and individually. In other words, the replication system shown in FIG. 7 can be considered as the replication system shown in FIG. 6 being expanded by connection of application servers.

In the example of FIG. 7, the connection of one application server to one database is equivalent to one database which is the unit of a replica in FIG. 6. In FIG. 7, a number of clients, a number of application servers and a number of databases may likewise be connected in the replication system of the present invention.

In the replication systems shown in FIGS. 6 and 7, each replica executes a transaction and each replica replicates a transaction log. It is assumed that replication conforms to the following constrains:

(Constraint-1) Each replica commits the same update with respect to the same transaction request.

(Constraint-2) A maximum of one transaction log is determined within one replica with respect to the same transaction request.

(Constraint-3) When there are two transactions log1, the log2 and log2 refers to and updates data generated by the log1, the transaction logs are reflected to each replica in the order of log1 and log2.

(Constraint-4) When the transaction logs are generated in the order of log1 and log2 by a single replica, log1 should be reflected before log2.

(Constraint-5) A transaction log which keeps an attribute of Serializable is reflected.

The attribute "Serializable" is a computer terminology relating to an isolation level to isolate transactions from one another, and means that data which is accessed by a transaction cannot be read or written by another transaction. Other attributes "Read Committed" (which means that uncommitted data cannot be read by a transaction) of the isolation level, "Read Uncommitted" (which means that data is read by a transaction regardless of whether it is committed or not) are excluded by the above constraints.

Figure 8:
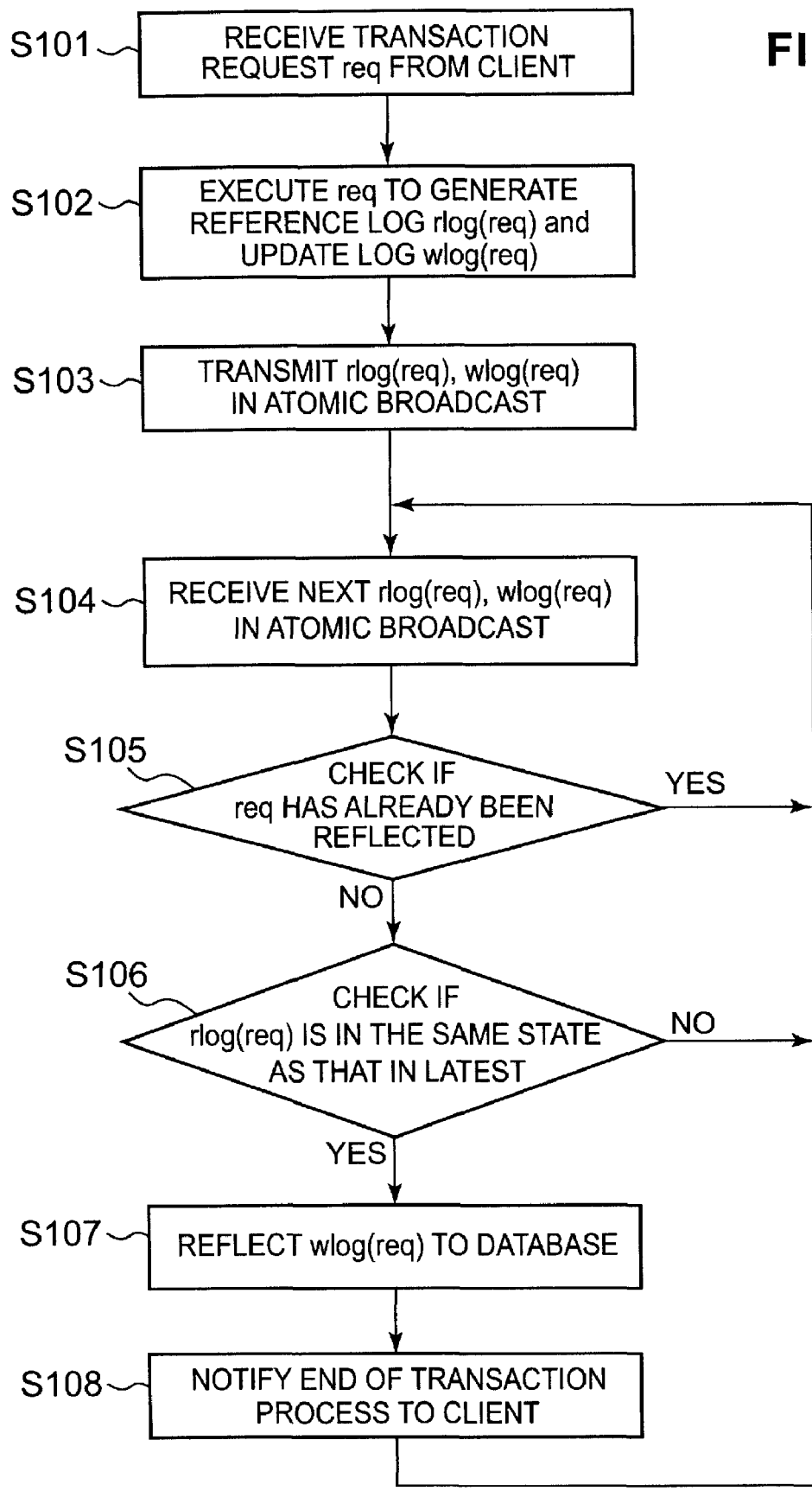
FIG. 8 is a flowchart illustrating the replication operation of one replica included in the embodiment of the present invention.

A replication having the above constraints can be realized as shown in FIG. 8.

Operation of Replication

FIG. 8 is a flowchart showing the procedures of replication that replicas perform. Individual steps operate as follows:
(Step S101) A replica receives a transaction process request req from a client.
(Step S102) The replica executes the transaction process request req and generates a reference log rlog(req) and an update log wlog(req).
(Step S103) The replica transmits the reference log rlog(req) and update log wlog(req) to other replicas in atomic broadcast.
(Step S104) The replica receives a next reference log rlog (req) and a next update log wlog(req) from other replicas in atomic broadcast.
(Step S105) The replica checks if the process request req has already been reflected, and goes to S104 if it has been reflected or goes to S106 if not.
(Step S106) The replica checks if the rlog(req) is the same as that in a latest database, and goes to S107 if it is the same or goes to S104 if not.
(Step S107) The replica reflects the update log wlog(req) to a database.
(Step S108) The replica notifies the client of the end of the transaction process and goes to S104.

The "atomic broadcast" is a broadcast which guarantees that a set of messages received and the receiving order are identical among all normal processes, and is a computer terminology which means one of important basic communication operations in designing distributed system having fault tolerance.

The transaction logs rlog and wlog are under the constraint-1 to the constraint-5.

The step S101 is executed upon reception of a transaction process request from a client.

The steps S104 to S108 are included in a loop which is always repeated regardless of whether there is a process request from a client or not. With the step S104 included in the loop of processes, a replica can repeatedly receive reference logs and update logs from other replicas.

That is, while the replicas according to the present invention repeats the loop, the replicas execute the steps S101 to S103 when receiving a transaction process request from a client.

The states of a transaction in the replication system shown in FIG. 8 are unresolved states from steps S103 to S107, and a committing state during a period from a point at which a replica reflects an update log at step S107 to a point at which each replica has the knowledge that the update log has been reflected. After each replica identifies a same committable update log, the transaction process goes to a committed state.

The optimistic result illustrated in FIG. 3 is transmitted to the client between step S102 and step S103 shown in FIG. 8. At this time, a replica notifies the client of the end of a speculative transaction, a process end identifying condition of the transaction and a subset of committed conditions. As mentioned above, the process end identifying condition of the transaction is comprised of a set of commitment conditions such that "to commit an update log of a transaction Ti generated by the replica A, the same update log as an update log of a transaction Tj generated by the replica A is committed (Ti=>Tj)", and a set of rollback condition such that "to commit an update log of a transaction Ti generated by the replica A, the same update log as an update log of a transaction Tj generated by the replica A is not committed (Ti<=>Tj)".

Commitment Conditions and Rollback Conditions

Figure 9:
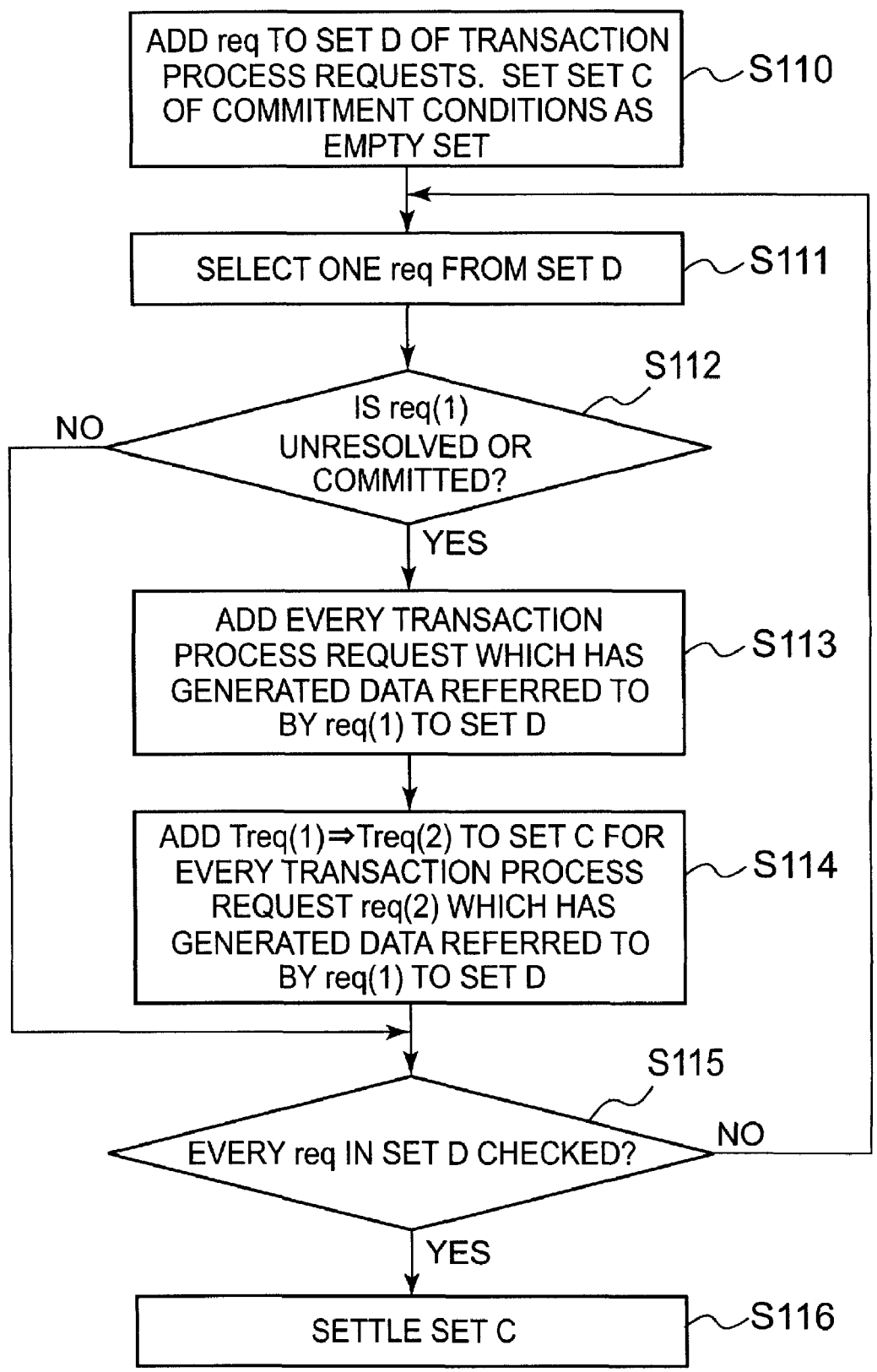
FIG. 9 is a flowchart illustrating a method of generating a set C of commitment conditions included in the embodiment of the present invention.

FIG. 9 is a flowchart showing the procedures of generating a set of commitment conditions to be transmitted by a replica according to the replication system. The procedures are an example of procedures after reception of the transaction process request req from the client shown in FIG. 8.

It is assumed that a replica has a set D of transaction process requests, a set C of commitment conditions, a set R of rollback conditions and a set S of committed conditions. Individual steps operate as follows: (Step S110) A replica adds req to the set D of transaction process requests and sets the set C of commitment conditions to an empty set.
(Step S111) The replica selects one req from the set D. To distinguish among the requests, notations such as req(1), req(2) are used.
(Step S112) The replica checks if the selected transaction process request, e.g., req(1), is in an unresolved state or committing state. The replica goes to S113 if the transaction process request is in either state, or goes to S115 if not.
(Step S113) The replica adds every transaction process request which has generated data referred to by req(1) to the set D.
(Step S114) The replica adds a logical formula (Treq(1) =>Treq(2)) to every transaction process request req(2) which has generated data referred to by req(1).
(Step S115) The replica determines whether every req in the set D has been checked. The replica goes to step S116 if every req has been checked, and goes to S111 if not.
(Step S116) The replica determines the set C of commitment conditions.

Figure 10:
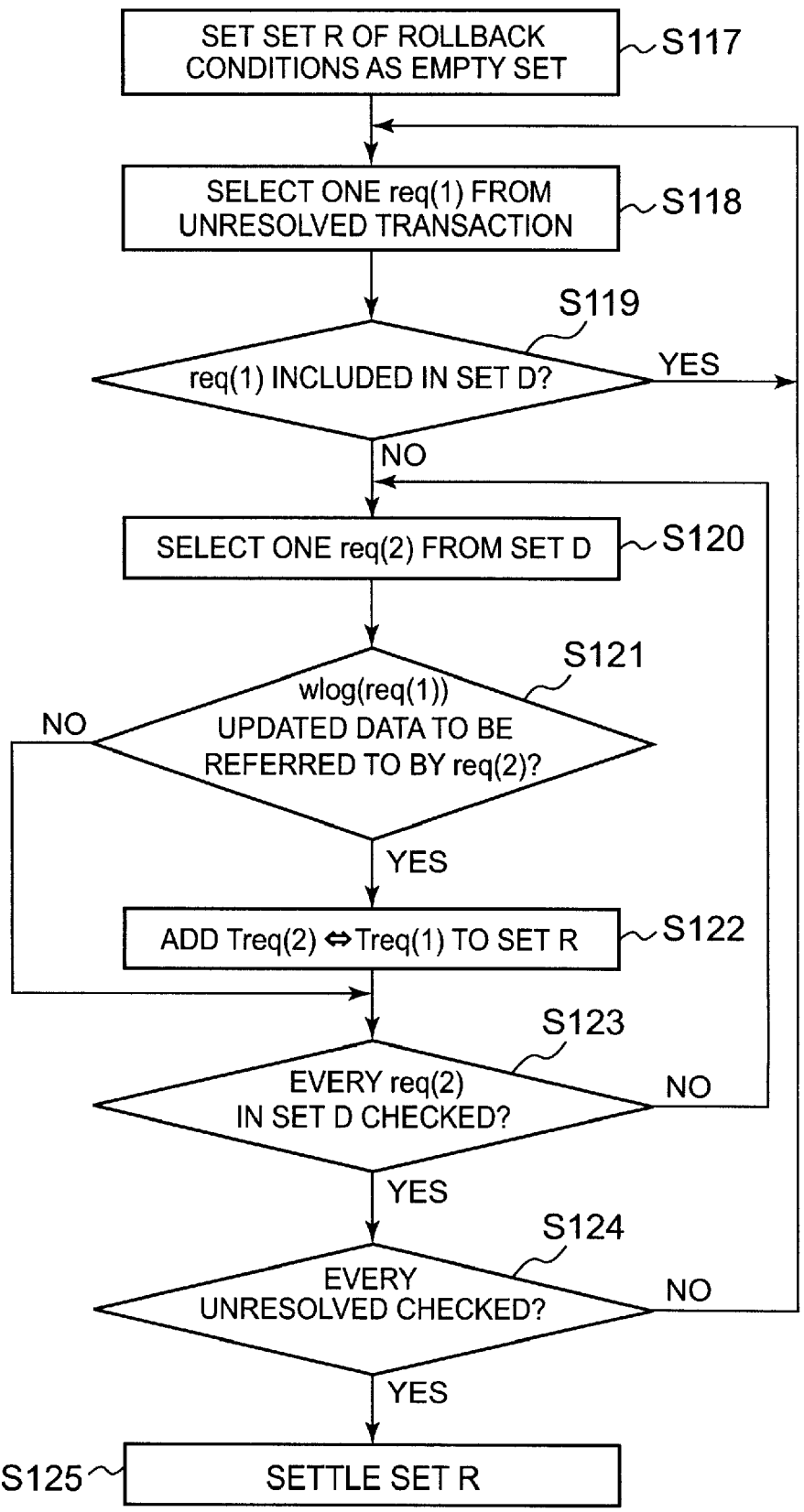
FIG. 10 is a flowchart illustrating a method of generating a set R of rollback conditions included in the embodiment of the present invention.

FIG. 10 is a flowchart showing the procedures of generating a set of rollback conditions to be transmitted by a replica according to the replication system.

Individual Steps Operate as Follows:
(Step S117) A replica sets the set R of rollback conditions to an empty set.
(Step S118) The replica selects one req from transactions in an unresolved state.
(Step S119) The replica checks if req(1) is included in the set D. The replica goes to S118 if it is included there, or goes to S120 if not.
(Step S120) The replica selects one req(2) from the set D of transaction process requests.
(Step S121) The replica checks based on the update log wlog (req(1)) if data to be referred to by the reference log rlog(req (2)) has been updated. The replica goes to S122 if the data has been updated, or goes to S123 if not.
(Step S122) The replica adds a logical formula (Treq(2) <=>Treq(1)) to the set R of rollback conditions.
(Step S123) The replica determines whether every req(2) in the set D has been checked. The replica goes to step S124 if every req(2) has been checked, and goes to S120 if not.
(Step S124) The replica determines whether every transaction in an unresolved state has been checked. The replica goes to step S125 if every such a transaction has been checked, and goes to S118 if not.
(Step S125) The replica determines the set R of rollback conditions.

Relationship of Subset Having Requests as Elements

Figure 11:
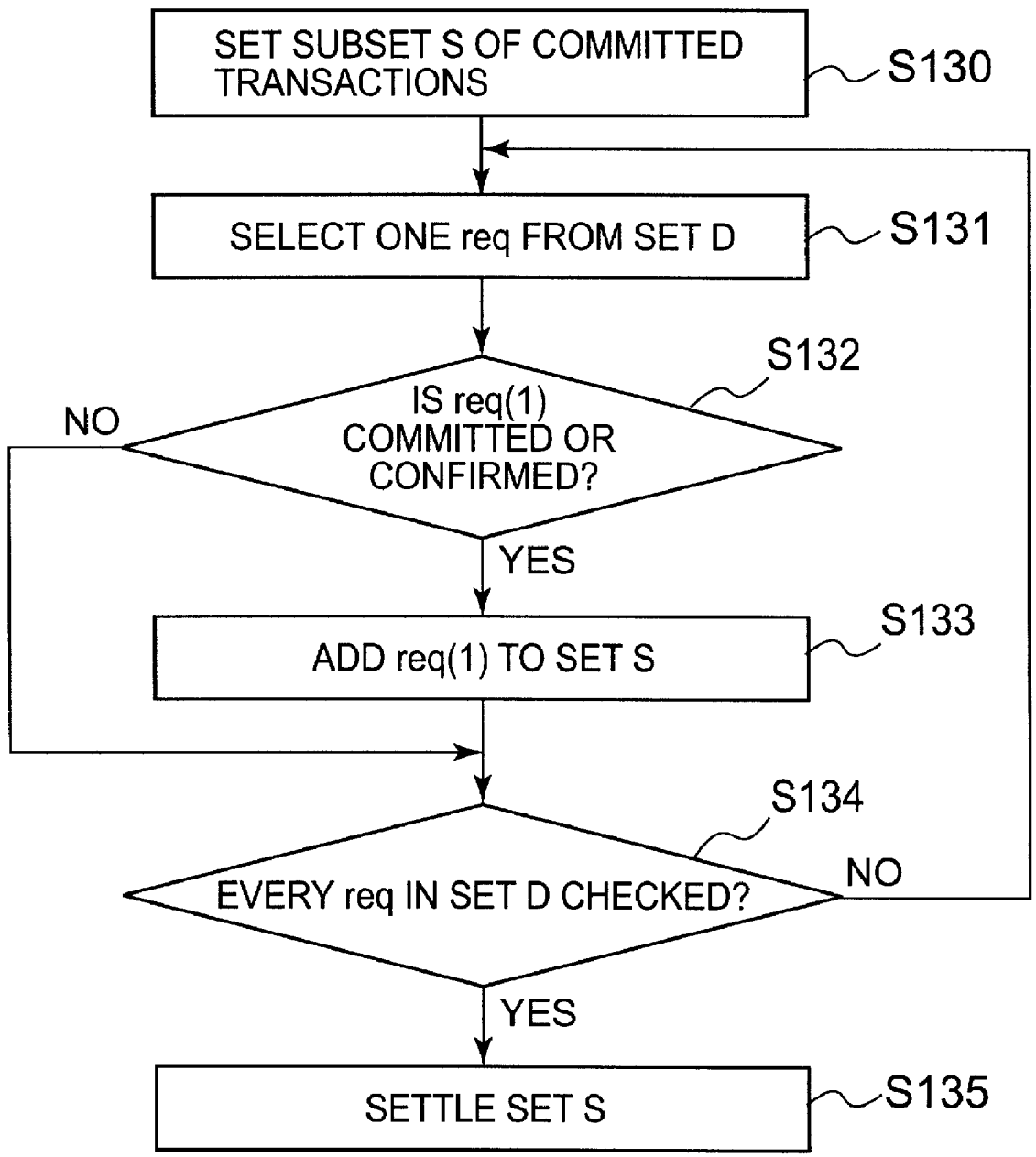
FIG. 11 is a flowchart illustrating a method of generating a subset S of committed transactions included in the embodiment of the present invention.

FIG. 11 is a flowchart showing the procedures of generating a subset of committed transactions to be transmitted by a replica according to the replication system. Individual steps operate as follows:
(Step S130) A replica sets a subset S of committed transactions to an empty set.

(Step S131) The replica selects one req(1) from the set D.
(Step S132) The replica checks if req(1) is in a committing state or committed state. The replica goes to S133 if it is in either state, or goes to S134 if not.
(Step S133) The replica adds req(1) to the set S.
(Step S134) The replica determines whether every req in the set D has been checked. The replica goes to step S135 if every req has been checked, and goes to S131 if not.
(Step S135) The replica determines the subset S of committed transactions.

Example of Determination of End of Transaction Process

Figure 12:
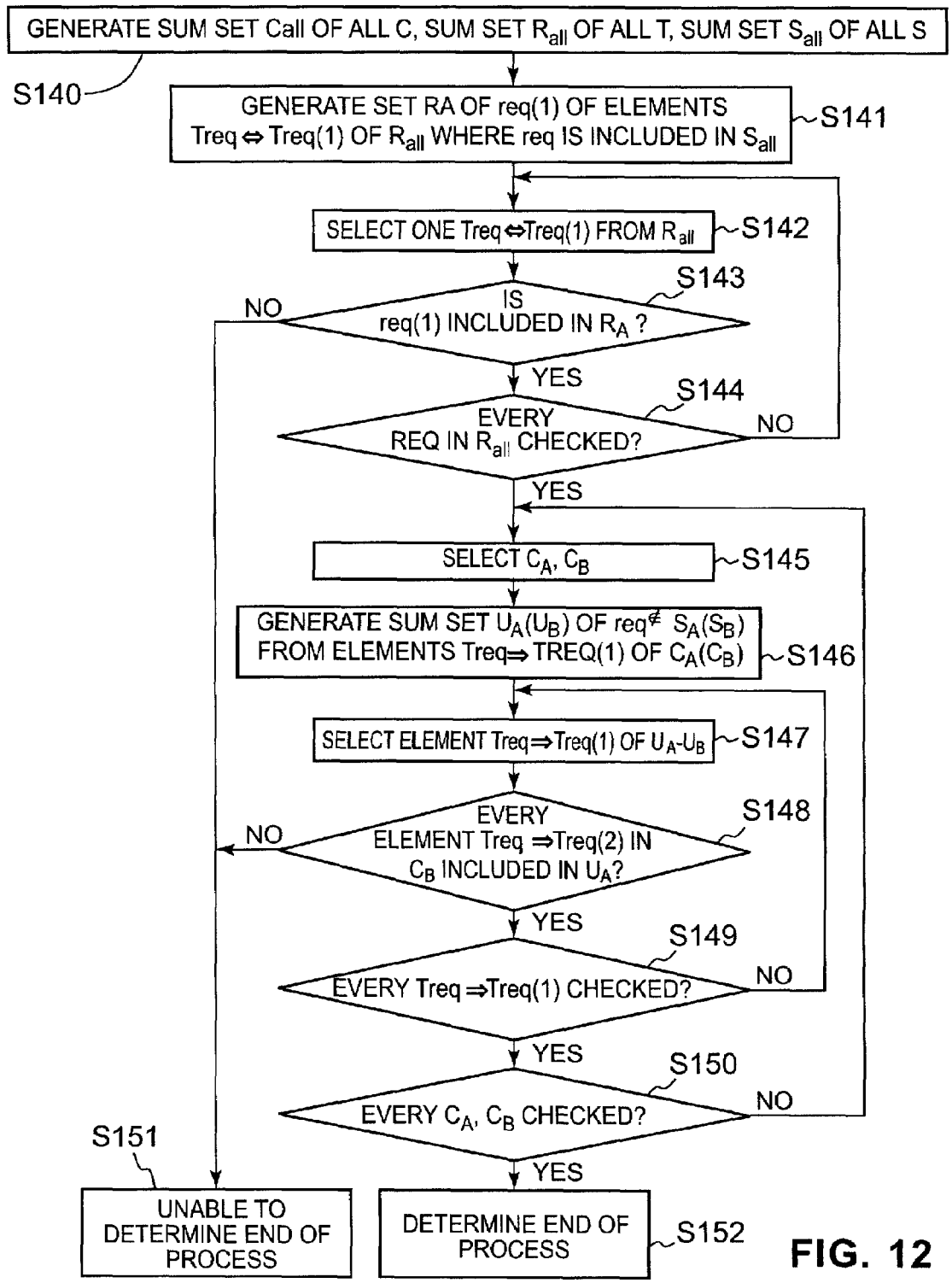
FIG. 12 is a flowchart illustrating a method of determining the end of a transaction process included in the embodiment of the present invention.

FIG. 12 is a flowchart showing the procedures in which a client determines whether a transaction process has been completed according to the replication system.

Individual Steps Operate as Follows:
(Step S140) A client generates a sum-set $C_{all}$ of all C, a sum-set $R_{all}$ of all R, and a sum-set $S_{all}$ of all S.
(Step S141) The client generates a set $R_A$ of req(1) with $R_{all}$ elements Treq<=>Treq(1) where req is included in $S_{all}$.
(Step S142) The client selects one Treq<=>Treq(1) from Rall.
(Step S143) The client checks if req(1) is included in $R_A$. The client goes to S144 if it is included there, or goes to S151 if not.
(Step S144) The client determines whether every req in $R_{all}$ has been checked. The client goes to S145 if it is checked, or goes to S142 if not.
(Step S145) The client selects sets $C_A$, $C_B$ of commitment conditions.
(Step S146) The client generates a set $U_A$ of req which does not belong to $S_A$ from elements Treq=>Treq(1) of $C_A$. The client likewise generates a set $U_B$ for the set $C_B$.
(Step S147) The client selects elements Treq=>Treq(1) of a differential set $(U_A - U_B)$.
(Step S148) The client determines whether every element Treq=>Treq(2) in $C_B$ is included in $U_A$. The client goes to S149 if it is included there, or goes to S151 if not.
(Step S149) The client determines whether every Treq=>Treq(1) has been checked. The client goes to S150 if it is checked, or goes to S147 if not.
(Step S150) The client determines whether every $C_A$, $C_B$ has been checked. The client goes to S152 if it is checked, or goes to S145 if not.
(Step S151) The client stores that the end of the requested transaction process cannot be determined.
(Step S152) The client determines the end of the requested transaction process, and stores the determination result.

Example 1 of Transaction Process

Example where Every Client can Determine the End of the Process

A transaction process according to the replication system will be illustrated as an example of money transfer between bank accounts.

For example, the replication system includes replicas db1, db2 and db3, connected to one client that can transfer money to accounts with account numbers 100, 101, 102, 104 from one to another.

Table 1 shows balances of the account numbers 100, 101, 102, 104 as initial conditions before transmission of a transaction process request.

TABLE 1

| account number | balance |
|---|---|
| 100 | 1,000 yen |
| 101 | 2,100 yen |
| 102 | 1,000 yen |
| 104 | 1,000 yen |

The client transmits a next transaction process request to the replication system with each account in the initial state in Table 1 being a process target.
(Transaction Treq(1)) Transfer 500 yen from the account 100 to account 101.
(Transaction Treq(2)) Transfer 2500 yen from the account 101 to the account 102 if the balance in the account 101 is equal to or greater than 2500 yen. Nothing is performed if the balance in the account 101 is less than 2500 yen.
(Transaction Treq(3)) Transfer 1000 yen from the account 100 to the account 104 if the balance in the account 100 is equal to or greater than 1000 yen. Nothing is performed if the balance in the account 100 is less than 1000 yen.

Table 2 shows values which are "speculatively" returned to the client when the individual transaction processes are executed in the order of Treq(1), Treq(2) and Treq(3) in the replication system which has received the transaction process request. The values to be speculatively returned mean the first processing result at the point when a replica transmits an optimistic result to the client.

TABLE 2

| transaction process request | commitment condition C | rollback condition R | committed S |
|---|---|---|---|
| req(1) | { } | {Treq(1)<=>Treq(2)} | { } |
| req(2) | {Treq(1)=>Treq(2)} |  | {req} |
| req(3) | { } | { } | { } |

When the replica db1 included in the replication system processes the transaction process requests in the order of Treq(1), Treq(2) and Treq(3) and the other replicas db2 and db3 process the requests in the same order, each replica transmits the same value as an optimistic result or the first processing result to the client. Therefore, the client can speculatively identify the end of the transaction process.

Example 2 of Transaction Process

Example where Every Client Cannot Determine the End of the Process

It is assumed that in the same transaction process with the initial condition in the Table 1, db1 and db3 process requests in the order of Treq(1), Treq(2) and Treq(3) and return the values in the Table 2 to the client. It is also assumed that db2 simultaneously executes Treq(1) and Treq(2) and values to be speculatively returned to the client are generated in the order of Treq(3) and Treq(1). It is further assumed that Treq(2) is executed by referring to the updated value of Treq(1) (Treq(1)=>Treq(2)).

Table 3 shows processing results to be returned to the client from db2. Because the processing results in Table 3 differ from those in Table 2, the flow is branched to S151 due to the conditional equation in S143 based on the determination scheme explained referring to FIG. 12, so that the client cannot determine the end of the transaction.

TABLE 3

| transaction process request | commitment condition C | rollback condition R | committed S |
|---|---|---|---|
| req(1) | { } | {Treq(1)<=>Treq(3)} | { } |
| req(2) | {Treq(1)=>Treq(2)} | {Treq(1)<=>Treq(3)} | { } |
| req(3) | { } | { } | { } |

Example 3 of Transaction Process

Example where a Client who has Requested req(2) can Determine the End of the Process It is assumed, as per Example 2, that in the same transaction process with the initial condition in the Table 1, db1 and db2 return the values in Table 2 and Table 3 to the client. It is also assumed that while db3 processes a transaction as per Example 2, an update log for req generated by db1 is reflected at the time db3 executes Treq(2).

Table 4 shows values to be returned to the client from db3 under those conditions. Because the client has requested req (2), the process jumps to S144 but does not jump to S151 as a result of the determination of the conditional equation in S143 based on the determination scheme in FIG. 12, so that the client can determine the end of the transaction.

TABLE 4

| transaction process request | commitment condition C | rollback condition R | committed S |
|---|---|---|---|
| req(1) | { } | {Treq(1)<=>Treq(3)} | { } |
| req(2) | {Treq(1)=>Treq(2)} | { } | {req} |
| req(3) | { } | { } | { } |

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A replication method for replicating data by a plurality of database servers connected to one another via a computer network, wherein each database server serves as a replica of others, comprising the steps of:
   receiving a same transaction process request;
   executing a transaction process and storing a process end identification condition for identifying end of a transaction process, a subset of committed transactions and a processing result as a first processing result;
   determining a single committed transaction log by communicating transaction logs with other replicas after storing the first processing result;
   notifying completion of commitment to all other replicas after committing the determined transaction log;
   storing a processing result of the committed transaction as a second processing result;
   storing a single same transaction process request in each replica;
   transmitting the transaction process request to each replica;
   receiving the first processing result from each replica, and identifying the first processing result as an optimistic result of a transaction under a condition that every process end identification condition is fulfilled; and
   receiving the second processing result from each replica and identifying the second processing result as a pessimistic result of a transaction, wherein said pessimistic result is received after the optimistic result.

2. The replication method according to claim 1, wherein the process end identification condition is a set of commitment conditions and set of rollback conditions generated by each replica in the transaction process, and the replication method further comprises the steps of:
   generating the set of commitment conditions based on every process request included in a set of the transaction process requests; and
   generating the set of rollback conditions based on every transaction process request in which any of the replicas fails to determine a single transaction log that all committed replicas.

3. The replication method according to claim 1, further comprising the steps of, in response to each replica determining a single committed transaction log by communicating transaction logs with other replicas after storing the first processing result:
   storing a processing result corresponding to the committable transaction log as the second processing result; and
   notifying completion of commitment to all other replicas after committing the determined transaction log.

4. The replication method according to claim 1, wherein the client further comprises a step of, at a stage of receiving the first processing result, identifying a rollback of a requested transaction process under a condition that there is a result different from any of the received results.

5. An article of manufacture tangibly embodying a computer readable program code having a non-transitory computer readable medium which when executed by a computer causes a processor to replicate data by a plurality of database servers connected to one another via a computer network, wherein each database server serves as a replica of others, the computer readable program code comprising the steps of:
   receiving a same transaction process request; causing each replica to execute a transaction process and storing a process end identification condition for identifying end of a transaction process, a subset of committed transactions and a processing result as a first processing result;
   determining a single committed transaction log by communicating transaction logs with other replicas after storing the first processing result;
   notifying completion of commitment to all other replicas after committing the determined transaction log;
   storing a processing result of the committed transaction as a second processing result;
   transmitting the transaction process request to each replica;
   receiving the first processing result from each replica, and identifying the first processing result as an optimistic result of a transaction under a condition that every process end identification condition is fulfilled; and
   receiving the second processing result from each replica and identifying the second processing result as a pessimistic result of a transaction, wherein at least one of the steps is executed on a computer device.

6. The article according to claim 5, wherein the process end identification condition is a set of commitment conditions and set of rollback conditions generated by each replica in the transaction process, and the article further comprises the steps of:

generating the set of commitment conditions based on every process request included in a set of the transaction process requests; and generating the set of rollback conditions based on every transaction process request in which any of the replicas fails to determine a single transaction log that all committed replicas.

7. The article according to claim 5, further comprising the steps of, in response to each replica determining a single committed transaction log by communicating transaction logs with other replicas after storing the first processing result:

storing a processing result corresponding to the committed transaction log as the second processing result; and notifying completion of commitment to all other replicas after committing the determined transaction log.

8. The article according to claim 5, wherein the client further comprises a step of, at a stage of receiving the first processing result, identifying a rollback of a requested transaction process under a condition that there is a result different from any of the received results.

* * * * *